(12) United States Patent
Lee et al.

(10) Patent No.: US 6,843,567 B2
(45) Date of Patent: Jan. 18, 2005

(54) HIGHLY EFFICIENT SCROLLING PROJECTION SYSTEM AND METHOD

(75) Inventors: Hee-joong Lee, Gyeonggi-do (KR); Kun-ho Cho, Gyeonggi-do (KR); Dae-sik Kim, Gyeonggi-do (KR); Sung-ha Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/651,218

(22) Filed: Aug. 29, 2003

(65) Prior Publication Data

US 2004/0066494 A1 Apr. 8, 2004

(30) Foreign Application Priority Data

Aug. 30, 2002 (KR) ................... 10-2002-0051994

(51) Int. Cl.[7] ................. G03B 21/14; G03B 21/20; G03B 21/26; G02F 1/1335; H04N 9/12
(52) U.S. Cl. ............... 353/31; 353/34; 353/37; 353/101; 353/102; 349/5; 348/742; 348/759
(58) Field of Search ................. 353/31, 34, 37, 353/84, 94, 97, 101, 102; 348/742, 743, 759; 349/5, 7, 8

(56) References Cited

U.S. PATENT DOCUMENTS

| | | | |
|---|---|---|---|
| 6,619,802 B2 | * | 9/2003 | Janssen et al. ........... 353/31 |
| 2003/0071123 A1 | * | 4/2003 | Tsikos et al. ............ 235/454 |
| 2004/0056824 A1 | * | 3/2004 | Sudo et al. .............. 345/7 |

* cited by examiner

Primary Examiner—Judy Nguyen
Assistant Examiner—Melissa J Koval
(74) Attorney, Agent, or Firm—Staas & Halsey LLP

(57) ABSTRACT

A projection system including a light source, a rectilinearly reciprocating cylindrical lens array, an optical separator, a light valve, and a projection lens unit. The light source emits a beam. The rectilinearly reciprocating cylindrical lens array advances color beams along different paths upon reciprocation. The optical separator separates the beam emitted from the light source into color beams according to wavelength. The light valve receives the scrolled color beams transmitted by the cylindrical lens array and forms a color image by pixels turning on or off according to an input image signal. The projection lens unit magnifies the color image formed on the light valve and projects the magnified color image on a screen.

29 Claims, 8 Drawing Sheets

HIGHLY EFFICIENT SCROLLING PROJECTION SYSTEM AND METHOD

CROSS-REFERENCE TO RELATED APPLICATIONS

This application claims the benefit of Korean Application No. 2002-51994, filed Aug. 30, 2002, in the Korean Intellectual Property Office, the disclosure of which is incorporated herein by reference.

BACKGROUND OF THE INVENTION

1. Field of the Invention

The present invention relates to a scrolling projection system, and more particularly, to a scrolling projection system of the single panel type which performs scrolling in an improved way so that the projection system is optically efficient and compact.

2. Description of the Related Art

Projection systems are classified into 3-panel projection systems and single-panel projection systems according to the number of light valves for controlling the on/off operation of light emitted from a high-output lamp on a pixel-by-pixel basis and forming a picture. Single-panel projection systems can have a smaller optical system than three-panel projection systems but provide an optical efficiency of ⅓ of that of three-panel projection systems because the red (R), green (G), and blue (B) colors into which white light is separated are used in a sequential method. Hence, attempts to increase the optical efficiency of single-panel projection systems have been made.

Generally, in a single-panel projection system, light radiated from a white light source is separated into R, G, and B colors using a color filter, and the three colors are sequentially sent to a light valve. The light valve appropriately operates according to the sequence of colors received and creates images. As described above, a single-panel optical system sequentially uses colors, so the light efficiency is reduced to ⅓ of the light efficiency of a three-panel optical system. A scrolling method has been proposed to solve this problem. In a color scrolling method, white light is separated into R, G, and B colors, and the three colors are sent to different locations on a light valve. Since an image is produced when all of the R, G, and B colors for each pixel reach the light valve, color bars are moved at a constant speed using a variety of methods.

Figure 1:
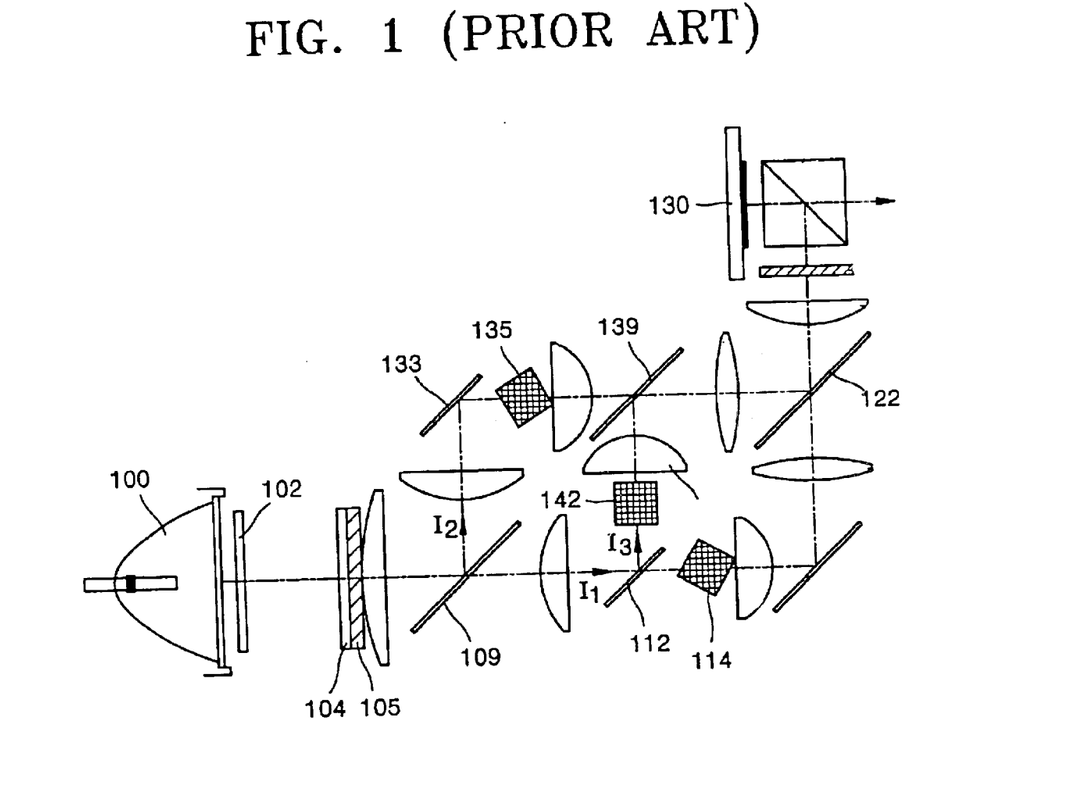
FIG. 1 shows a conventional projection system.

In a conventional single-panel scrolling projection system, as shown in FIG. 1, white light emitted from a light source 100 passes through first and second lens arrays 102 and 104 and a polarized beam splitter array 105 and is separated into R, G, and B beams by first through fourth dichroic filters 109, 112, 122, and 139. To be more specific, the red beam R and the green beam G, for example, are transmitted by the first dichroic filter 109 and advance along a first light path I1, while the blue beam B is reflected by the first dichroic filter 109 and travels along a second light path I2. The red beam R and the green beam G on the first light path I1 are separated by the second dichroic filter 112. The second dichroic filter 112 transmits the red beam R along the first light path I1 and reflects the green beam G along a third light path I3.

As described above, the light emitted from the light source 100 is separated into the red beam R, the green beam G, and the blue beam B, which are scrolled while passing through corresponding first through third prisms 114, 135, and 142. The first through third prisms 114, 135 and 142 are disposed on the first through third light paths I1, I2, and I3 and rotate at a uniform speed such that R, G, and B colors are scrolled. I2 includes a mirror 133. The green beam G and the blue beam B that travel along the second and third light paths I2 and I3, respectively, are transmitted and reflected by the third dichroic filter 139 and then combined. Finally, the R, G, and B beams are combined by the fourth dichroic filter 122. The combined beam is transmitted by a polarized beam splitter 127 and forms a picture using a light valve 130.

Figure 2:
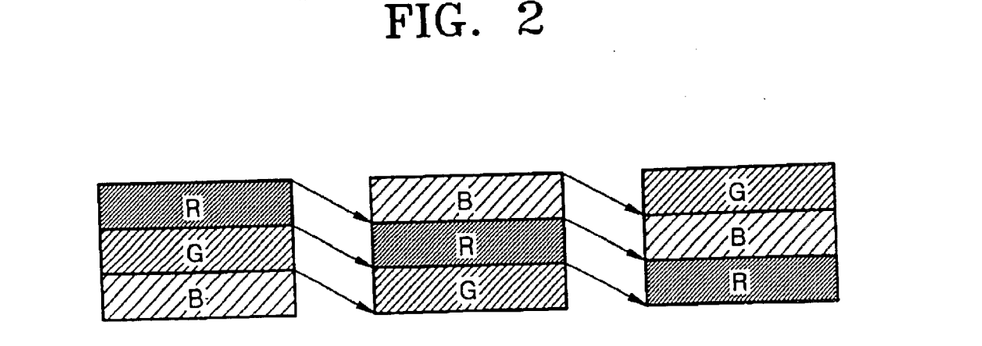
FIG. 2 shows R, G, and B color bars to explain the color scrolling operation of a projection system.

The scrolling of the R, G, and B color bars due to the rotation of the first through third prisms 114, 135, and 142 is shown in FIG. 2. Scrolling represents the movement of color bars formed on the surface of the light valve 130 when prisms corresponding to the R, G, and B colors are synchronously rotated.

The light valve 130 processes picture information depending on an on-off signal for each pixel and forms a picture. The formed picture is magnified by a projecting lens (not shown) and is projected onto a screen.

Since such a method is performed using a light path provided for each color, a light path correction lens must be provided for each color, and a component part for re-collecting separated light beams must be provided for each color. Accordingly, an optical system becomes larger, and the yield degrades due to a complicated manufacturing and assembling process. In addition, a large amount of noise is generated due to the driving of three motors for rotating the first through third prisms 114, 135, and 142, and the manufacturing costs of a conventional projection system adopting the above-described method is higher than a color wheel method using only one motor.

In order to produce a color picture using a scrolling technique, color bars as shown in FIG. 2 must be moved at a constant speed. Since the conventional projection system must synchronize a light valve with three prisms in order to achieve scrolling, controlling the synchronization is not easy. Further, because the scrolling prisms 114, 135, and 142 make circular motions while color bar scrolling is rectilinearly performed, the color scrolling speed by the three scrolling prisms is irregular, consequently deteriorating the quality of an image.

SUMMARY OF THE INVENTION

The present invention provides a projection system in which color scrolling is performed by rectilinear reciprocation of a plate-like cylindrical lens array, such that optical loss is minimized, and color scrolling is performed using a single cylindrical lens array, such that the projection system is compact, scrolling speed is easily controlled, and synchronization with a light valve is easily achieved.

Additional aspects and/or advantages of the invention will be set forth in part in the description which follows and, in part, will be obvious from the description, or may be learned by practice of the invention.

According to one aspect of the present invention, there is provided a projection system including a light source, a rectilinearly reciprocating cylindrical lens array, an optical separator, a light valve, and a projection lens unit. The light source emits a beam. The rectilinearly reciprocating cylindrical lens array advances color beams along different paths upon reciprocation. The optical separator separates the beam emitted from the light source into color beams according to wavelength. The light valve receives the scrolled color beams transmitted by the cylindrical lens array and forms a color image by pixels turning on or off according to an input image signal. The projection lens unit magnifies the color image formed on the light valve and projects the magnified color image on a screen.

The driving unit includes a guide bracket which supports and guides the cylindrical lens array, a cam which is coupled to the cylindrical lens array to rectilinearly reciprocate the cylindrical lens array, and a motor which drives the cam.

A cam groove can be either formed along the sidewall of the cam or on the upper surface of the cam.

The rotating frequency of the motor is determined so that the cylindrical lens array rectilinearly moves in synchronization with the operation frequency of the light valve.

A pair of fly-eye lenses may be disposed on a light path between the cylindrical lens array and the light valve. Also, a relay lens may be disposed on a light path between the pair of fly-eye lenses and the light valve to focus an incident color beam on a respective color area of the light valve.

The optical separator may include first through third dichroic filters which are inclined at different angles with respect to incident light, split incident light according to wavelength ranges, and advance the color beams at different angles and the cylindrical lens array is disposed on a light path between the optical separator and the light valve.

The optical separator may include first through third dichroic filters which are inclined at different angles with respect to incident light, split incident light according to wavelength ranges, and advance the color beams at different angles and the cylindrical lens array is disposed on a light path between the light source and the optical separator.

According to still another aspect of the present invention, there is provided a lens array having a plurality of cylindrical lens cells arranged to form a plate and to advance light rays passing through the lens cells along different paths upon reciprocation of the cylindrical lens array.

According to still another aspect of the present invention, there is provided a method of projecting an image, including: emitting a light beam; separating the light beam into a plurality of color beams according to wavelength; scrolling the color beams by reciprocating an optical element having a plurality of lens cells arranged to form a plate; focusing the color beams onto a light valve and turning pixels of the light valve one of on and off according to a received image signal so as to form a color image; magnifying the color image; and projecting the magnified color image onto a screen.

According to yet another aspect of the present invention, there is provided a projection system including a light source, only one rectilinearly reciprocating cylindrical lens array, an optical separator, a light valve, and a projection lens unit. The light source emits a beam. The rectilinearly reciprocating cylindrical lens array advances color beams along different paths upon reciprocation. The optical separator separates the beam emitted from the light source into color beams according to wavelength. The light valve receives the scrolled color beams transmitted by the cylindrical lens array and forms a color image by pixels turning on or off according to an input image signal. The projection lens unit magnifies the color image formed on the light valve and projects the magnified color image on a screen.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
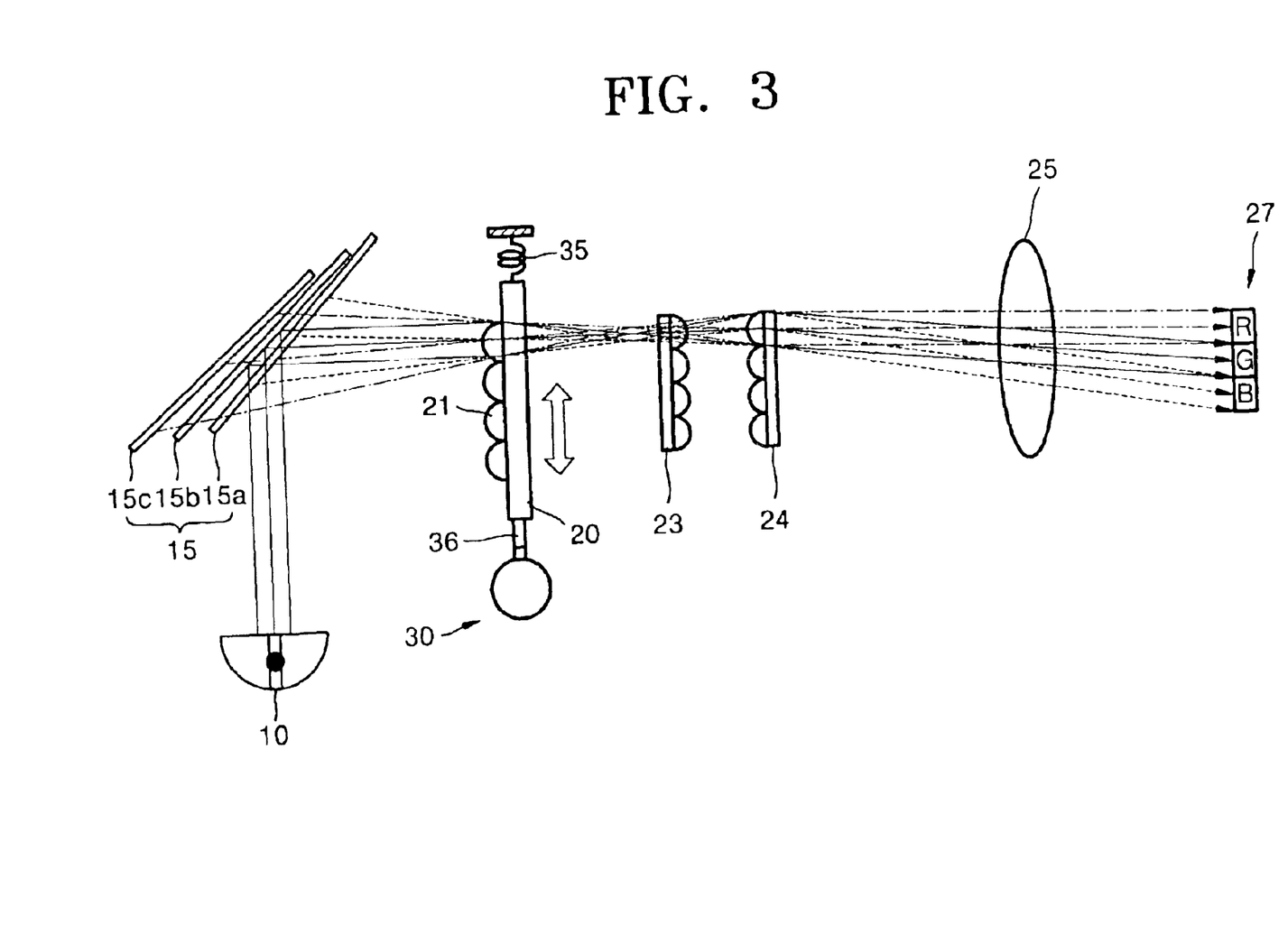
FIG. 3 is a schematic diagram of a projection system according to an embodiment of the present invention.

Referring to FIG. 3, a projection system according to an embodiment of the present invention includes a light source 10, an optical separator 15, and a cylindrical lens array 20. The light source 10 radiates a light beam. The optical separator 15 separates the light beam emitted from the light source 10 according to wavelength into color beams. The cylindrical lens array 20 rectilinearly reciprocates to perform color scrolling. Color beams, into which the beam emitted from the light source 10 is separated by the optical separator 15, propagate through the cylindrical lens array 20 and are then incident upon respective color areas of the light valve 27. The color beams are incident upon the light valve 27. A color image is formed by turning pixels on or off according to a received image signal.

The optical separator 15 includes first, second, and third dichroic filters 15a, 15b, and 15c inclined at different angles with respect to a propagation direction of incident light beam. The optical separator 15 separates an incident light beam into color beams according to a predetermined wavelength range and advances the separated beams at different angles. For example, the first dichroic filter 15a reflects a beam in the red wavelength range, an R beam, from a white incident beam and, at the same time, transmits beams in the green and blue wavelength ranges, G and B beams. The second dichroic filter 15b reflects the G beam from the G and B beams transmitted by the first dichroic filter 15a and, at the same time, transmits the B beam. The third dichroic filter 15c reflects the B beam transmitted by the first and second dichroic filters 15a and 15b.

The R, G, and B beams into which incident light has been separated according to wavelength by the first, second, and third dichroic filters 15a, 15b, and 15c are reflected at different angles. The R and B beams are focused around the same location as the G beam and then made incident upon the cylindrical lens array 20. The separated colors are each scrolled by the cylindrical lens array 20 when it is rectilinearly reciprocated.

The beams scrolled by the cylindrical lens array 20 are processed by the light valve 22 according to an image signal to form a color image. The color image formed by the light valve 27 is magnified by a projection lens unit (not shown) and projected onto a screen.

The cylindrical lens array 20 is a plate on which cylinder lens cells 21 are aligned in parallel and adjacent to each other, and the cylindrical lens cells 21 each have the same size as the individual pixels of the light valve 27. The cylindrical lens array 20 is rectilinearly reciprocated by a driving unit 30.

Figure 4A:
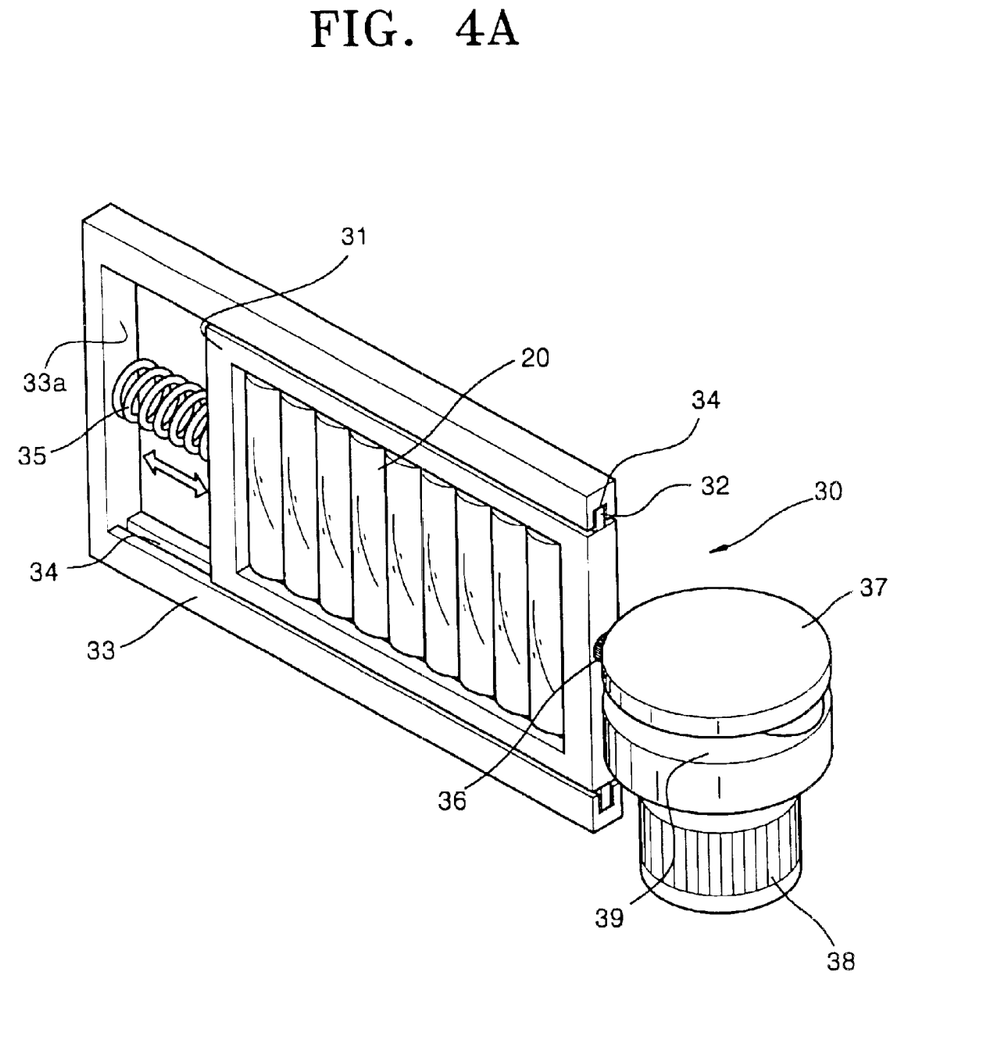
FIG. 4A is a perspective view of an example of a driving unit for driving a plate-like cylindrical lens array used in the projection system of FIG. 3.
Figure 4B:
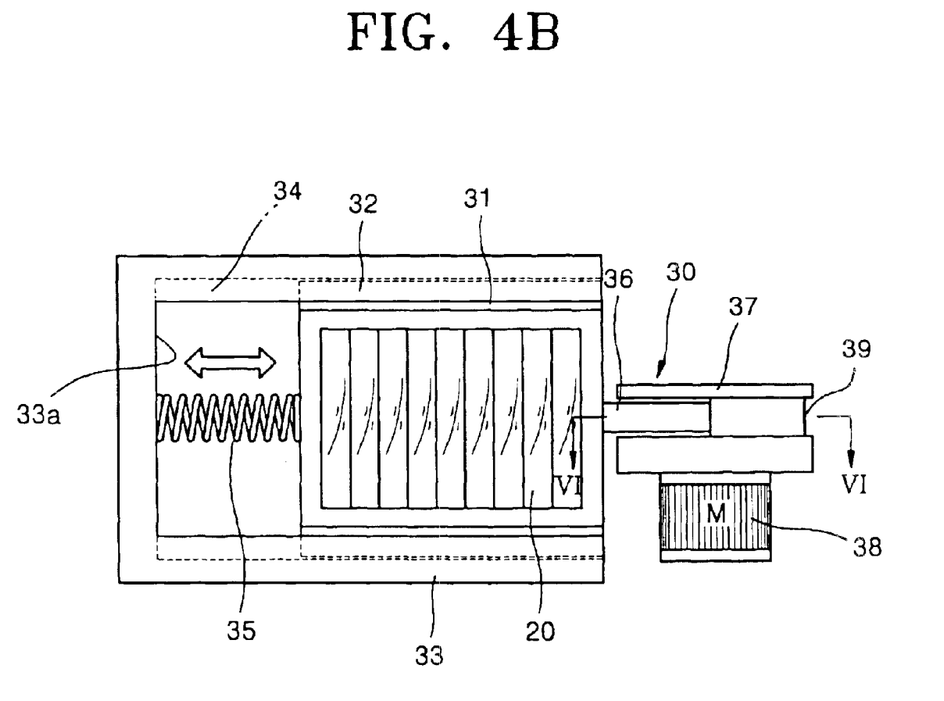
FIG. 4B is a front view of the driving unit of FIG. 4A.

Referring to FIGS. 4A and 4B, the driving unit 30 includes a cam 37 which converts rotation of a motor 38 which drives the cam 37 into rectilinear motion of the cylindrical lens array 20. A connector 36 protrudes from one sidewall of a holder 31, which supports the cylindrical lens array 20, is coupled to the cam 37 and interacts with the cam 37. A guide rail 32 is formed lengthwise on the top and bottom sides of the holder 31, and a guide groove 34, which corresponds to the guide rail 32, is formed in a guide bracket 33 for guiding and rectilinearly moving the holder 31. The holder 31 rectilinearly moves along the guide groove 34 of the guide bracket 33.

The guide bracket 33 is formed in a "⊏" shape, and an elastic member 35 is installed between an inner sidewall 33a of the guide bracket 33 and the holder 31. The elastic member 35 functions as a buffer since it is installed along the axial direction of the rectilinear motion of the cylindrical lens array 20. Also, when the cylindrical lens array 20 moves, the elastic member 35 functions to restore the cylindrical lens array 20 back to its original position.

Figure 5:
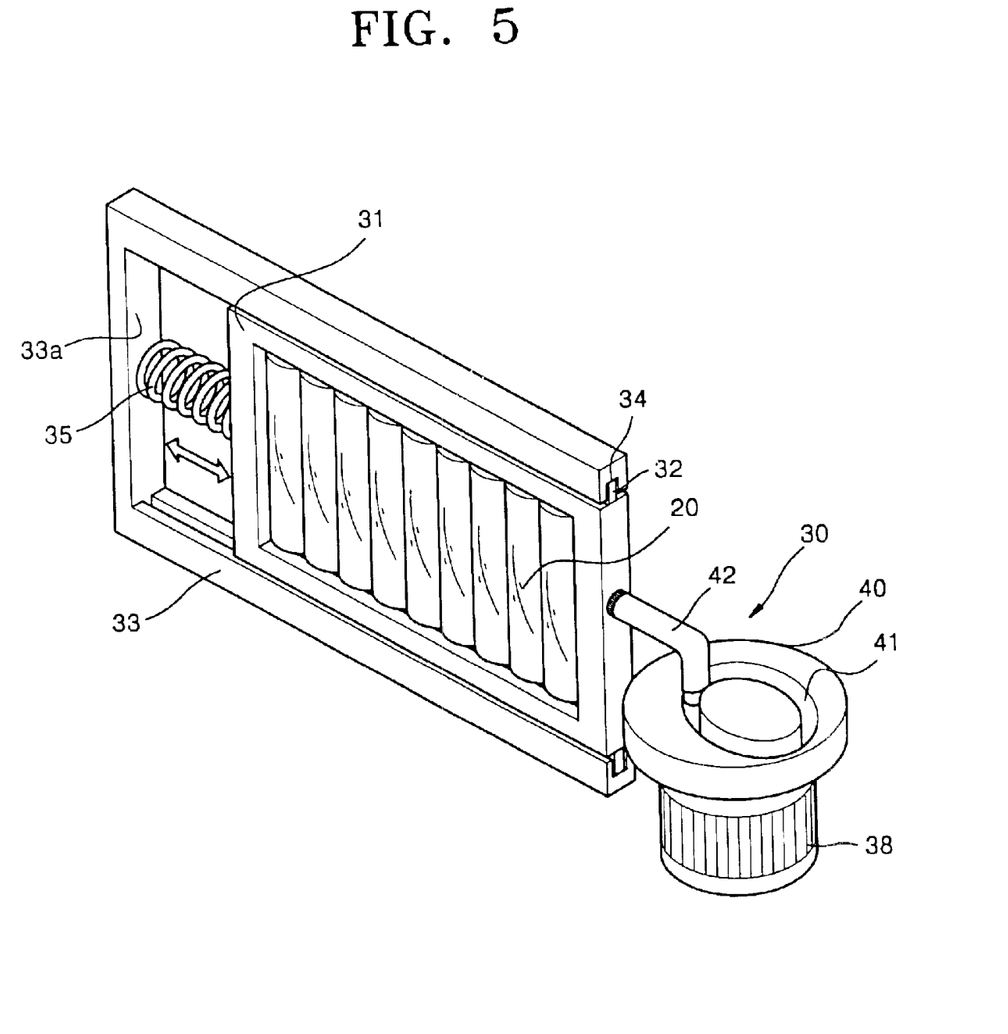
FIG. 5 is a perspective view of another example of the driving unit for driving the plate-like cylindrical lens array used in the projection system of FIG. 3.

The cam 37, in cooperation with the connector 36, converts rotation of the motor 38 into a rectilinear motion and has a cam groove 39 formed along the sidewall of the cam 37. When the connector 36 is inserted into the cam groove 39, and the resultant cam 37 is rotated, the guide bracket 33 is rectilinearly moved. FIG. 4A shows the cam groove 39 formed along the sidewall of the cam 37, whereas FIG. 5 shows a cam groove 41 which is formed on the top of the cam 40. A connector 42, which is inserted into the cam groove 41, can be formed in a "⊓" shape. The elements of FIG. 5 which are designated by the same reference numerals as those of FIG. 4A substantially execute the same functions and operations, so they will not be described in detail.

Figure 6A:
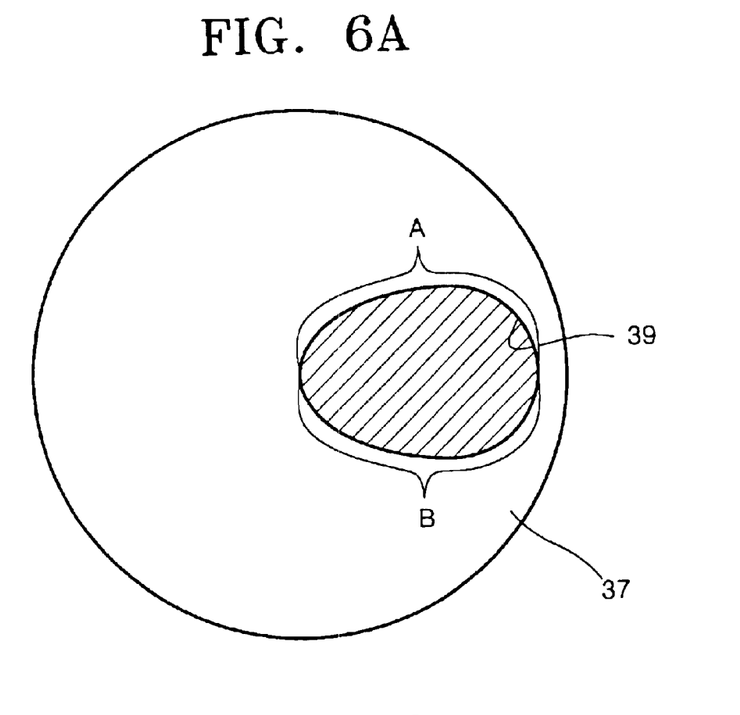
FIGS. 6A and 6B show examples of a cam groove formed in a cam for driving a plate-like cylindrical lens array.

The shape of the cam groove 39 (shown in FIG. 4A) or 41 (shown in FIG. 5) and the rotation speed of the motor 38 determine the moving section and moving speed of the cylindrical lens array 20. FIG. 6A shows an example of the shape of the cam groove 39 or 41. The shape of the cam groove 39 or 41 of FIG. 6A has one-time periodicity (i.e., a frequency of one). Periodicity denotes the period of a rectilinear motion made by the cam 37 or 40, that is, denotes a period in which the cylindrical lens array 20 is moved by the motion of the cam 37 or 40 and then restored to its original position. While the cam 37 or 40 moves a section A, the cylindrical lens array 20 is rectilinearly moved as much as possible. Then, while the cam 37 or 40 moves a section B, the cylindrical lens array 20 is restored to its original position by a restoration force.

Figure 6B:
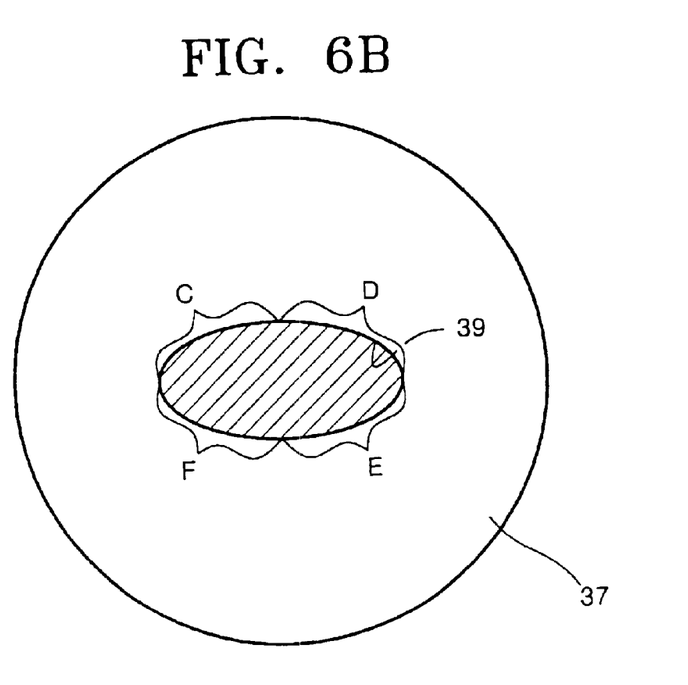

Another example of the shape of the cam groove 39 (shown in FIG. 4A) or 41 (shown in FIG. 5) is shown in FIG. 6B. The shape of the cam groove 39 or 41 shown in FIG. 6B has a two-time periodicity (i.e., a frequency of two). Sections C and D represent a first period, and sections E and F represent a second period. If the motor 38 or the cam 37 or 40 rotates at a constant speed, the moving speed of the cylindrical lens array 20 increases as the period of the cam groove 39 or 41 decreases. Accordingly, the moving speed of the cylindrical lens array 20 can be controlled by changing the period of the cam groove 39 or 41 or by controlling the rotation speed of the motor 38. The rotation speed, that is, the rotation frequency, of the motor 38 can be synchronized with the operating frequency of the light valve 27. Alternatively, the rotation speed of the motor 38 can be synchronized with the operating frequency of the light valve 27 by controlling the number of lens cells of the cylindrical lens array 20. In other words, while the speed of a rectilinear motion of the cylindrical lens array 20 is maintained, the number of lens cells is increased. Consequently, the scrolling speed is increased, such that the increased scrolling speed can keep up with the increased operating frequency of the light valve 27.

Referring back to FIG. 3, first and second fly-eye lenses 23 and 24 and a relay lens 25 are provided on a light path between the cylindrical lens array 20 and the light valve 27. The three beams, namely, R, G, and B beams, obtained by the optical separator 15 are incident upon the individual lens cells 21 of the cylindrical lens array 20. The three color beams incident upon each of the lens cells 21 propagate through the first and second fly-eye lenses 23 and 24 and the relay lens 25 and are focused on their respective color areas of the light valve 27, thereby forming color bars. This process will be described in detail later. A color scrolling method using only the optical separator 15 and the cylindrical lens array 20 excluding the first and second fly-eye lenses 23 and 24 and the relay lens 25 will now be described with reference to FIG. 7.

Figure 7:
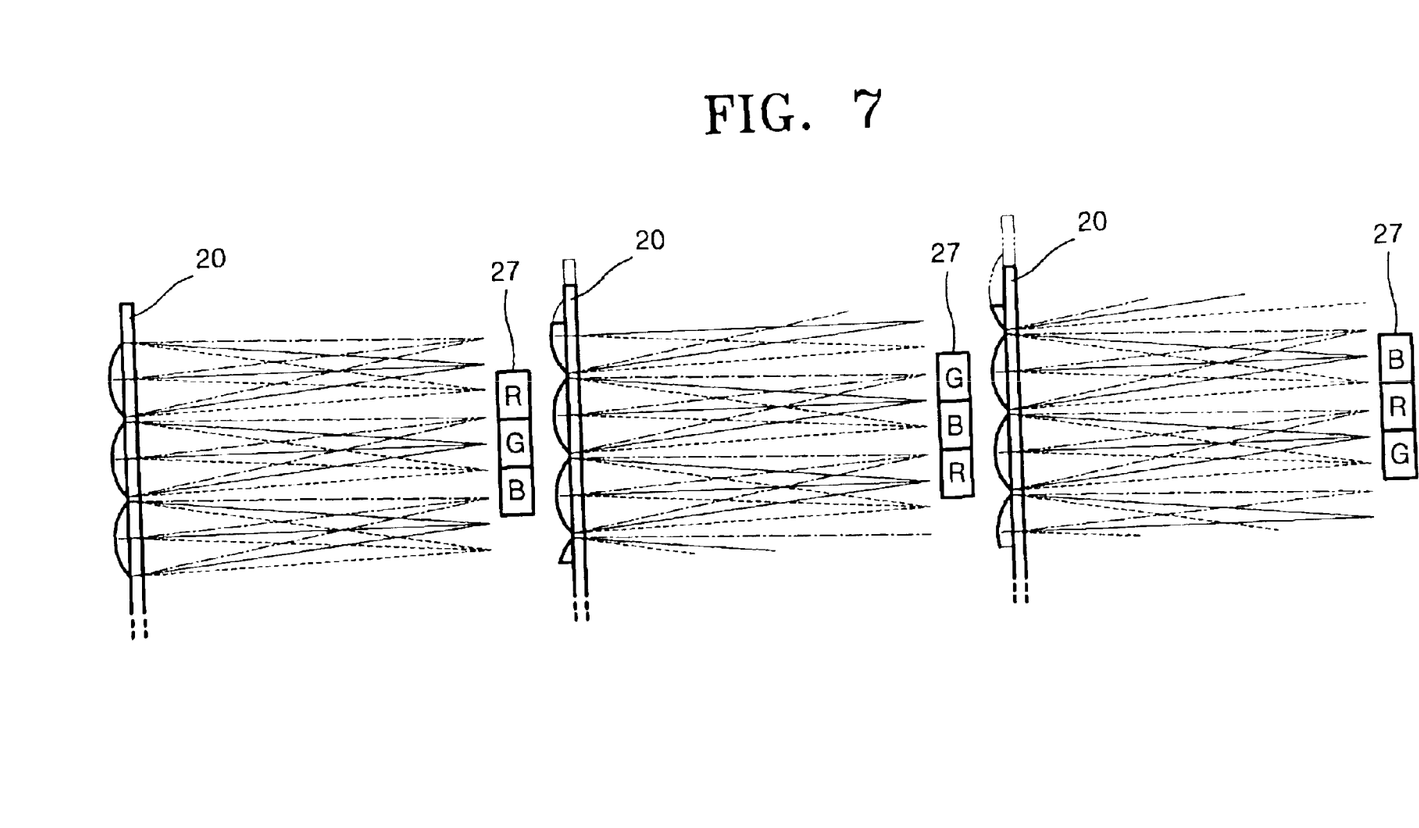
FIG. 7 shows the scrolling operation of the projection system according to the projection system shown in FIG. 3.

As the cylindrical lens array 20 is rectilinearly reciprocated by the driving unit 30, the areas on the cylindrical lens array 20 through which beams propagate change consecutively and periodically. Accordingly, the areas of the light valve 27 upon which the R, G, and B beams of the individual lens cells 21 are focused change periodically in units of lens cells.

First, light passes through the cylindrical lens array 20 and forms color bars on the light valve 27 in an R, G, then B order. Next, as the cylindrical lens array 20 rectilinearly moves, the lens surface of the cylindrical lens array 20 gradually moves upward or downward while the light passes through the cylindrical lens array 20. Accordingly, color bars are formed in a G, B, then R order. Then, as the cylindrical lens array 20 continues to move, color bars are formed in a B, R, then G order. Color bars are scrolled every time the lens cells 21 are moved by ⅓ of the width of a lens cell 21. While the scrolling is periodically repeated, the individual pixels on the light valve 27 are turned on or off, thereby forming a color image.

For example, while the cylindrical lens array 20 is being moved in a direction, scrolling is performed in an R, G, then B order. In this case, while the cylindrical lens array 20 is being moved in the other direction, scrolling is performed in a B, G, then R order. In consideration of this relationship, the image signal processing of the light valve 27 when the cylindrical lens array 20 is moved in one direction is different from when the cylindrical lens array 20 is moved in the other direction. Accordingly, when the cylindrical lens array 20 rectilinearly reciprocates, color images can be consecutively obtained, and light loss that can occur during a motion in one direction can be prevented.

A projection system according to an embodiment of the present invention is a single-panel projection system and uses substantially all of an incident beam, thus greatly improving the optical efficiency compared to conventional single-panel projection system using a color wheel. Furthermore, the projection system according to the above-described embodiment of the present invention may be optically efficient three-panel projection systems while being more compact.

As described above, because color scrolling is performed by rectilinearly reciprocating the cylindrical lens array 20, color scrolling can be easily controlled with continuity and consistency. Also, because color scrolling is performed using only one cylindrical lens array, color scrolling can be easily synchronized with the operating frequency of the light valve 27. Furthermore, the color scrolling method based on a rectilinear motion is better in preventing error generation than a conventional color scrolling method based on the circular motion of a prism.

Figure 8:
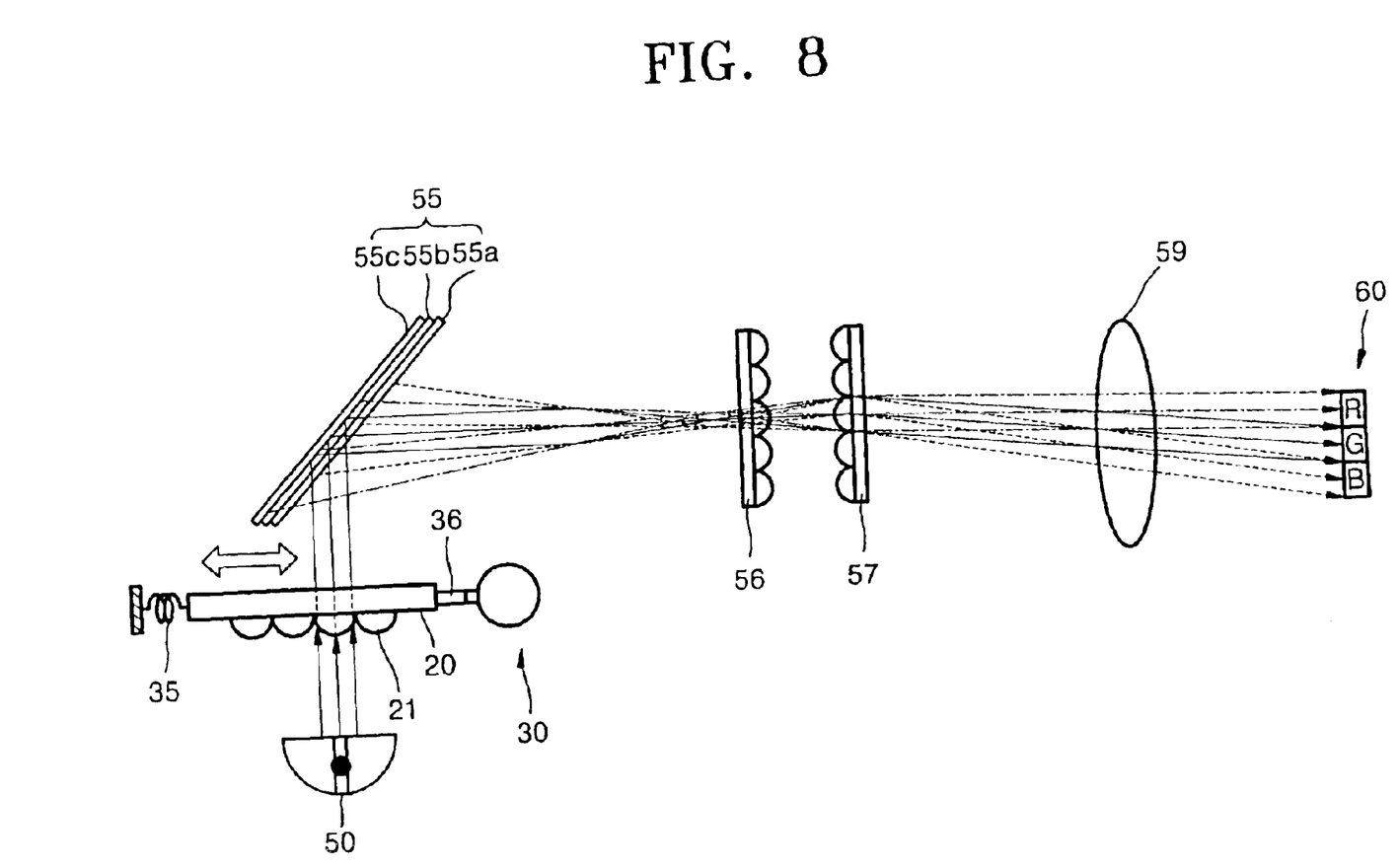
FIG. 8 is a schematic diagram of a projection system according to another embodiment of the present invention.

A projection system according to another embodiment of the present invention is shown in FIG. 8. Referring to FIG. 8, a beam emitted from a light source 50 is separated into units of lens cells 21 while propagating through the cylindrical lens array 20, which rectilinearly reciprocates, and is separated according to a wavelength by an optical separator 55.

The cylindrical lens array 20 has the same structure as described above and is rectilinearly reciprocated by a driving unit 30 to accomplish color scrolling.

The optical separator 55 is comprised of first, second, and third dichroic filters 55a, 55b, and 55c that are parallel to one another. A prism (not shown) may be further included adjacent to the optical separator 55. The beams transmitted by each of the lens cells 21 of the cylindrical lens array 20 are incident upon the optical separator 55 along different paths. While the beams are separated according to color by the optical separator 55, they are reflected to different locations on the first, second, and third dichroic filters 55a, 55b, and 55c. Accordingly, color beams are later focused onto respective color areas of a light valve 60.

R, G, and B beams reflected by the first through third dichroic filters 55a, 55b, and 55c are transmitted by first and second fly-eye lenses 56 and 57 in a one-to-one correspondence and are focused on three respective color areas of the light valve 60 via a relay lens 59.

The second embodiment is different from the first embodiment in that the optical splitter 55 is installed after the cylindrical lens array 20. However, the driving unit 30 which drives the cylindrical lens array 20 to rectilinearly reciprocate can be equally applied to the second embodiment as in the first embodiment.

In a projection system according to the above-described embodiments of the present invention, scrolling can be performed by a rectilinear reciprocation of a single-plate cylindrical lens array. Thus, scrolling is easily controlled, and color beams can be transmitted along only one optical path. Consequently, the number of components is reduced, and a light, cost-efficient projection system can be obtained.

In addition, color scrolling can be performed with continuity and consistency at a constant speed.

Since a conventional single-panel projection system produces color images by sequentially separating white light into R, G, and B light beams, the efficiency of light to be used by a light valve is degraded to ⅓ of the light efficiency of a three-panel projection system. However, in a single-panel projection system adopting a scrolling technique according to the present invention, white light is separated into R, G, and B beams at one time, and the R, G, and B beams are scrolled to form a color image. Therefore, the single-panel projection system according to the present invention can obtain the same light efficiency as the light efficiency of a three-panel projection system.

Although a few embodiments of the present invention have been shown and described, the present invention is not limited to the disclosed embodiments. Rather, it would be appreciated by those skilled in the art that changes and modifications may be made in this embodiment without departing from the principles and spirit of the invention, the scope of which is defined by the claims and their equivalents.

What is claimed is:

1. A projection system comprising:
    a light source emitting a beam;
    a rectilinearly reciprocating cylindrical lens array which advances color beams along different paths upon reciprocation, so as to scroll the color beams;
    an optical separator which separates the beam emitted from the light source into color beams according to wavelength;
    a light valve which receives the scrolled color beams transmitted by the cylindrical lens array and forms a color image by turning pixels on or off according to an input image signal; and
    a projection lens unit which magnifies the color image formed on the light valve and projects the magnified color image on a screen.

2. The projection system of claim 1, further comprising a driving unit which drives the cylindrical lens array.

3. The projection system of claim 1, wherein the driving unit comprises.
    a guide bracket supporting and guiding the cylindrical lens array;
    a cam coupled to the cylindrical lens array to convert rotational motion thereof into reciprocating rectilinear motion of the cylindrical lens array; and
    a motor which rotates the cam.

4. The projection system of claim 3, wherein the cam has a cam groove formed one of along a sidewall of the cam and on an upper surface of the cam.

5. The projection system of claim 4, wherein the cam groove has a shape that causes the cam to reciprocate the cylindrical lens array at least one time per rotation of the cam.

6. The projection system of claim 2, wherein the cylindrical lens array is a plate having plural lens cells whose widths are the same as the widths of the pixels of the light valve.

7. The projection system of claim 2, wherein a scrolling speed of the cylindrical lens array is synchronized with an operating frequency of the light valve.

8. The projection system of claim 2, wherein an increase in one of the number of the plurality of lens cells and the reciprocating speed of the cylindrical lens array increases the scrolling speed.

9. The projection system of claim 2, wherein a decrease in one of the number of the plurality of lens cells and the reciprocating speed of the cylindrical lens array increases the scrolling speed.

10. The projection system of claim 2, wherein an elastic member is disposed between the cylindrical lens array and the guide bracket so as to provide recovery force in an axial direction urging the cylindrical lens array to an original position.

11. The projection system of claim 2, further comprising a pair of fly-eye lenses disposed on a light path between the cylindrical lens array and the light valve.

12. The projection system of claim 11, wherein the first and second fly eye lenses have a plurality of 2 dimensionally arranged lens cells.

13. The projection system of claim 11, further comprising a relay lens disposed on a light path between the fly-eye lens pair and the light valve to focus an incident color beam on a respective color area of the light valve.

14. The projection system of claim 2, wherein the optical separator includes first through third dichroic filters which are inclined at different angles with respect to incident light, split the incident light according to wavelength ranges, and advance the color beams at different angles and the cylindrical lens array is disposed on a light path between the optical separator and the light valve.

15. The projection system of claim 2, wherein the optical separator includes first through third dichroic filters which are inclined at different angles with respect to incident light, split the incident light according to wavelength ranges, and advance the color beams at different angles and the cylindrical lens array is disposed on a light path between the light source and the optical separator.

16. The projection system of claim 2, wherein the processing of the input image signal by the light valve when the cylindrical lens array rectilinearly moves in a forward direction is different from when the cylindrical lens array rectilinearly moves in a backward direction, so that a color image can be obtained upon forward and backward movement of the cylindrical lens array.

17. The projection system of claim 2, wherein the cylindrical lens array reciprocates at a constant speed and direction.

18. The projection system of claim 1, wherein an increase in one of the number of the plurality of lens cells and the reciprocating speed of the cylindrical lens array increases the scrolling speed.

19. The projection system of claim 1, wherein a decrease in one of the number of the plurality of lens cells and the reciprocating speed of the cylindrical lens array increases the scrolling speed.

20. The projection system of claim 1, further comprising a pair of fly-eye lenses disposed on a light path between the cylindrical lens array and the light valve.

21. The projection system of claim 20, wherein the first and second fly eye lenses have a plurality of 2 dimensionally arranged lens cells.

22. The projection system of claim 20, further comprising a relay lens disposed on a light path between the fly-eye lens pair and the light valve to focus an incident color beam on a respective color area of the light valve.

23. The projection system of claim 1, wherein the optical separator includes first through third dichroic filters which are inclined at different angles with respect to incident light, split the incident light according to wavelength ranges, and advance the color beams at different angles and the cylindrical lens array is disposed on a light path between the optical separator and the light valve.

24. The projection system of claim 1, wherein the optical separator includes first through third dichroic filters which are inclined at different angles with respect to incident light, split the incident light according to wavelength ranges, and advance the color beams at different angles and the cylindrical lens array is disposed on a light path between the light source and the optical separator.

25. The projection system of claim 1, wherein the processing of the input image signal by the light valve when the cylindrical lens array rectilinearly moves in a forward direction is different from when the cylindrical lens array rectilinearly moves in a backward direction, so that a color image is determined upon forward and backward movement of the cylindrical lens array.

26. The projection system of claim 1, wherein the cylindrical lens array reciprocates at a constant speed and direction.

27. The projection system of claim 1, wherein the optical separator separates the beam into three color beams, one color beam having a wavelength corresponding to red, one color beam having a wavelength corresponding to green, and one color beam corresponding having a wavelength corresponding to blue.

28. A method of projecting an image, comprising:

emitting a light beam;

separating the light beam into a plurality of color beams according to wavelength;

scrolling the color beams by reciprocating an optical element having a plurality of lens cells arranged to form a plate;

focusing the color beams onto a light valve and turning pixels of the light valve one of on and off according to a received image signal so as to form a color image;

magnifying the color image; and projecting the magnified color image onto a screen.

29. A projection system comprising:

a light source emitting a beam;

only one rectilinearly reciprocating cylindrical lens array which advances color beams along different paths upon reciprocation, so as to scroll the color beams;

an optical separator which separates the beam emitted from the light source into color beams according to wavelength;

a light valve which receives the scrolled color beams transmitted by the cylindrical lens array and forms a color image by turning pixels on or off according to an input image signal; and a projection lens unit which magnifies the color image formed on the light valve and projects the magnified color image on a screen.

* * * * *

UNITED STATES PATENT AND TRADEMARK OFFICE
CERTIFICATE OF CORRECTION

PATENT NO. : 6,843,567 B2
DATED : January 18, 2005
INVENTOR(S) : Hee-joong Lee et al.

It is certified that error appears in the above-identified patent and that said Letters Patent is hereby corrected as shown below:

Column 8,
Line 30, after "comprises" delete "." and insert -- ; --;

Column 9,
Line 2, change "fly eye" to -- fly-eye --;
Line 44, change "fly eye" to -- fly-eye --.

Signed and Sealed this

Sixteenth Day of August, 2005

JON W. DUDAS
*Director of the United States Patent and Trademark Office*